Figure 1:
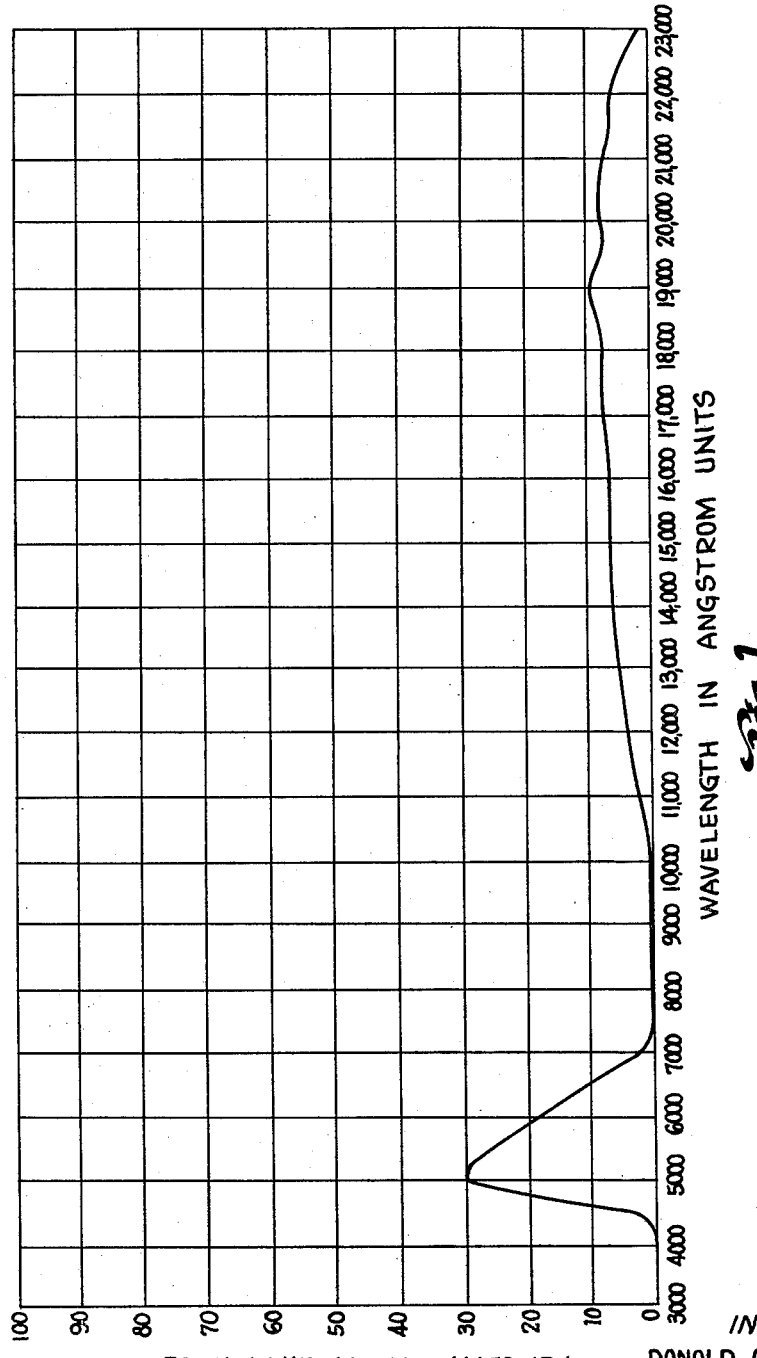

March 17, 1964     D. O. HOFFMAN     3,125,535
OPTICAL FILTERS AND METHOD OF MAKING SAME
Filed March 20, 1961

INVENTOR
DONALD O. HOFFMAN
BY
ATTORNEYS

United States Patent Office 3,125,535
Patented Mar. 17, 1964

3,125,535
OPTICAL FILTERS AND METHOD OF MAKING SAME
Donald O. Hoffman, Sturbridge, Mass., assignor to American Optical Company, Southbridge, Mass., a voluntary association of Massachusetts
Filed Mar. 20, 1961, Ser. No. 96,863
5 Claims. (Cl. 252—300)

The field of this invention is that of light-absorbing filters, and the invention relates, more particularly to novel and improved plastic materials and to novel and improved methods for manufacturing plastic materials having infra-red and ultra-violet absorbing characteristics.

At the present time, light filter materials of a vitreous nature are used in many different applications where plastic filter materials would be preferred for various reasons if plastic materials could be adapted to display the desired absorptive and transmissive properties. For example, plastic materials adapted for relatively high transmission of visible light and for relatively high absorption of invisible light would be useful substitutes for glass lens materials presently employed in sunglasses and the like.

It is an object of this invention to provide novel and improved plastic filter materials and methods for manufacturing such materials; to provide plastic materials and methods for manufacturing plastic materials which are adapted for relatively high transmission of visible light and for suitably high absorption of infra-red and ultra-violet light; to provide plastic materials and methods for manufacturing such materials which are adapted for suitably high transmission of visible light of at least selected wavelengths and which are adapted for substantially complete cutoff of infra-red and ultra-violet light of at least selected wavelengths; and to provide such methods for material manufacture which can be conveniently and economically performed.

Other objects and advantages of the plastic filter materials and methods of material manufacture provided by this invention appear in the following detailed description of preferred embodiments of the materials and methods, the detailed description referring to the drawings in which FIG. 1 illustrates a transmission curve for a plastic filter material provided by this invention.

According to this invention, organic dye compounds of the polyindamine class are established in dispersed relation within a matrix or carrier formed by a plastic material to adapt the plastic material for relatively high transmission of visible light and for suitably high absorption of infra-red and ultra-violet light. It will be noted that the term "light" as used herein is intended to include all radiations of the electromagnetic spectrum including infra-red and ultra-violet radiations as well as visible light.

In the process of this invention, two solutions are prepared in suitable receptacles, and a normally transparent, plastic material is supplied. One solution, hereinafter designated solution A, is essentially comprised of one of a selected group of aniline derivatives dissolved in a solvent which is adapted to permeate the plastic material whereas the other solution, hereinafter designated solution B, embodies at least one of a selected group of oxidizing agents dissolved in a similar solvent. The plastic material is immersed in one of the solutions to imbibe the solution and to establish the solution in dispersed relation therein. Then the plastic material is immersed in the other solution to imbibe the other solution therein, thereby to induce a reaction in situ within the plastic material between the aniline derivative and the oxidizing agent carried in the respective solutions.

It is believed that this imbibition process results in reaction between the aniline derivative of solution A and the oxidizing agent of solution B to oxidatively polymerize the aniline derivative and then to effect the further stepwise oxidation of polymers of the aniline derivative for forming variously-oxidized, organic, polyindamine dye compounds in dispersed relation within the plastic material. In this reaction, certain of the organic dye compounds will progress through one or more low oxidized states and through a series of intermediately oxidized states to achieve what can be considered as highly oxidized forms of the aniline derivative, whereas oxidation of other organic dye compounds will not progress so far and will achieve only one or the other of the low or intermediately oxidized forms of the aniline derivative. Only the organic polyindamine dye compounds which are said to be in an intermediately oxidized state are believed to have substantial infra-red-absorbing properties so that the infra-red-absorbing characteristics provided in the plastic material will depend to a large extent upon regulation of the imbibition process and resulting reaction to establish the desired density of intermediately oxidized forms of the dye compounds within the plastic material.

In forming intermediately oxidized infra-red-absorbing forms of the organic polyindamine dye compounds within a plastic material as described above, said compounds can be provided in greater or lesser quantities for determining the transmissive and absorptive properties of the plastic material. As the quantity of said organic dye compounds within the plastic material is increased, the plastic material will, of course, be adapted to transmit less light in both the visible and invisible regions of the spectrum. The greatest proportion of the organic dye compounds formed within the plastic material in the described imbibition process will comprise intermediately oxidized, infra-red-absorbing forms of the dye compounds where the described reaction occurs in the presence of a relatively large amount of the selected aniline derivative. That is, where the selected aniline derivative is present in relatively large quantities, the described reaction will tend to create increasing quantities of intermediately oxidized forms of the dye compounds without tending to form any substantial proportion of highly oxidized, less highly infra-red-absorbing, dye compounds. Thus, for example, it will generally be desirable, in order to achieve a larger proportion of intermediately oxidized dye compounds, to arrange the sequence of the described imbibition steps so that a plastic material having a quantity of the selected oxidizing agent established in dispersed relation therein is immersed in a highly concentrated solution A as the final step in the imbibition process. Further, where the imbibition process is arranged for forming increasing quantities of infra-red-absorbing dye compounds in a final immersion in solution A in the manner described, the plastic material can be conveniently removed from soluton A when the desired quantity of said dye compounds have been formed, thereby to provide a plastic filter material having predetermined infra-red and ultra-violet absorbing properties. Preferably, the imbibition process includes an initial immersion of the plastic material in solution A followed by an immersion of the plastic in solution B and another, final, immersion of the plastic in solution A. It has been found that this sequence of imbibition steps results in a more rapid formation of the desired organic dye compounds.

The above-described imbibition process can be employed for forming infra-red and ultra-violet absorbing filters from many different plastic materials where solutions A and B embody solvents which are adapted to dissolve the noted aniline derivatives and oxidizing agents to achieve desired concentrations thereof and which are adapted to permeate the selected plastic material. For example, where it is desired that the plastic material comprise a film of cellulose acetate, cellulose butyrate, cellulose nitrate, ethyl cellulose, cellulose propionate, polyvinyl chloride, acetate and the like, the solvent can comprise any of the lower alkyl alcohols such as methyl, ethyl, propyl, butyl or amyl alcohols. However, where the plastic material is of a water soluble nature such as gelatin, polyvinyl alcohol, carboxymethyl-cellulose or hydrolyzed cellulosic materials such as hydrolyzed cellulose acetate and hydrolyzed cellulose nitrate, water would be the preferred solvent. Mixtures of water and alcohol can also be used, and partially dissolving active solvents such as the aldehydes or ketones, for example acetone, can be added thereto if desired.

The plastic materials treated in the process of this invention are preferably provided in the form of thin sheets or films which can be mounted upon supporting materials prior to treatment or can be sandwiched between supporting materials after treatment if desired. However, the plastic materials can also be provided in the form of relatively thick sheets or plates or can comprise cast objects such as lenses.

Organic substances which have proven useful for incorporation into the plastic materials from solution A comprise various aniline derivatives including aniline, o-toluidine, m-toluidine, N-phenyl-p-phenylenediamine, 2,5-diethoxyaniline, and 2,5-dimethoxyaniline, each of which is adapted to be absorbed by the noted plastic materials when imbibed therein in a suitable solution and which is adapted to be oxidatively polymerized and then to be further oxidized in step-wise progression for forming the above-described infra-red and ultra-violet absorbing organic polyindamine dye compounds in dispersed relation within the plastic materials.

Oxidizing agents which are adapted to be dispersed within the plastic material from solution B for forming the described polyindamine dye compounds by reaction with the above-noted organic aniline derivatives include permanganate salts such as potassium permanganate, dichromate salts such as ammonium dichromate, sodium dichromate and potassium dichromate, chromate salts such as potassium chromate, ferricyanide salts such as potassium ferricyanide, vanadate salts such as ammonium vanadate, vanadyl salts such as vanadyl chloride, chlorate salts such as sodium chlorate, chlorite salts, hypochlorite salts, peroxides such as sodium peroxide, oxides such as lead dioxide and manganese dioxide, iodate salts such as potassium iodate, persulfate salts such as ammonium persulfate and bromate salts such as sodium bromate. Nascent oxygen generated, for example, by the gradual addition of sodium peroxide to a three percent (3%) solution of hydrogen peroxide has also proven to be an effective oxidizing agent for the purposes of this invention. The above-noted oxidizing agents can be embodied in solution B either individually or in combination with others of the noted oxidizing agents. In order to regulate the described imbibition process for establishing the desired quantities of said organic dye compounds within a plastic material, concentrations of the selected aniline derivative or oxidizing agent in solutions A and B and the periods of time during which the plastic material is permitted to imbibe said solutions can be varied over relatively wide ranges. Of course, where relatively high concentrations of said solutions are utilized, the desired quantities of said organic dye compounds can be established in the plastic material at a relatively more rapid rate.

As a practical matter, a one percent (1%) concentration of the selected aniline derivative in solution A might be the lowest concentration of solution A which would be utilized, and preferably, the concentration of solution A is relatively high, for example at or near saturation, for substantially reducing the period of time required for said imbibition process.

Similarly, a one percent (1%) concentration of a selected oxidizing agent in solution B might be the minimum concentration of solution B which would be of practical use and preferably the concentration of solution B is relatively high, for example at or near saturation, for substantially reducing the period of time required for said imbibition process.

In order to form infra-red-absorbing polyindamine dye compounds within a plastic material in the described imbibition process, reaction between the organic substance of solution A and the oxidizing agent of solution B must occur in an acidic environment. However, it will be noted that solution A embodying any one of the listed aniline derivatives will normally be a basic solution whereas solution B embodying at least one of the listed oxidizing agents will generally be more or less acidic. According to this invention, solutions A and B should each have a selected pH such that, when both solutions have been imbibed by a plastic material, the solutions will not tend to neutralize each other or to establish a basic environment within the plastic material. Since solution B will normally comprise an acidic solution as noted above, an acid, preferably a mineral acid, can be added to solution A to achieve a desirable pH for that solution. In this regard, it should be noted that formation of the desired organic dye compounds by the oxidation of aniline itself generally requires a more acidic environment than is required when other aniline derivatives are used. Therefore, where solution A embodies aniline as a dye former, sufficient acid is preferably added to the solution for achieving a pH between 0 and 3.5 in the solution. Where other aniline derivatives are embodied in solution A, acid can be added to the solution for achieving a pH between 0 and 6.5 although formation of the desired organic dye compounds will generally occur more rapidly where solution A has a relatively low pH. Where solution A embodies an aqueous solvent, the addition of a mineral acid such as sulfuric, hydrochloric, or nitric acid to the solution is of further advantage in substantially increasing the concentration of the selected aniline derivative which can be obtained in the solution.

In performing the described imbibition process, the solutions A and B are preferably maintained at temperatures between approximately 55° F. and 200° F., imbibition of the solutions within a plastic material and completion of the described reaction within the plastic material being accomplished at a substantially more rapid rate where the solutions A and B are maintained at relatively high temperatures. In this regard, however, it should be noted that where the plastic material is to remain in either solution A or solution B for more than a few minutes for providing the plastic material with desired infra-red-absorbing characteristics, temperatures in the solution above 120° F. are likely to induce excessive swelling of the plastic material. Sodium chloride or other inorganic salts can be added to either solution A or solution B in concentrations up to twenty-five percent (25%) for preventing the swelling of the plastic material during immersion in said solutions, as will be understood. Addition of sodium chloride to the solutions will also tend to slightly increase the rate at which the described reaction can occur in situ within the plastic material.

Where the concentrations of solutions A and B are relatively high and where the solutions are maintained at relatively high temperatures within the ranges previously described, a selected plastic material can be provided with significant infra-red absorbing properties following an immersion of the plastic material in each of solutions A and B for a period as short as five (5) seconds. On the other hand, where the concentrations of solutions A and B and the temperature at which the solutions are maintained are less favorable for the formation of organic infra-red-absorbing dye compounds in the plastic material, the plastic can be immersed in each solution for a period up to sixteen (16) hours without reducing the visible transmittance of the plastic material below reasonable levels. Preferably, solutions A and B embody a selected aniline derivative and oxidizing agent respectively at nearly saturated concentration and are maintained at approximately room temperature during the imbibition process. In this arrangement, a plastic material can be adapted for suitably high transmission of visible light and suitably high absorption of infra-red and ultra-violet light for use in sunglasses and the like after an immersion of the plastic in solutions A and B for periods of a few minutes each. This provides a fairly rapid process while allowing adequate control over the periods of immersion of the plastic to achieve plastic materials having predetermined transmission and absorptive properties.

For example, three solutions can be prepared which are hereinafter designated solutions A, $A_1$ and B. Solution A embodies 1 gram of aniline, 10 grams of sodium chloride, and 1 cc. of concentrated (36%) hydrochloric acid in 100 cc. of water, thereby to provide a solution having a pH of 2. Solution $A_1$ is identical to solution A. Solution B embodies 50 grams of ammonium persulfate in 100 cc. of water. Then a plastic material is provided which comprises a cellulose acetate butyrate supporting film of approximately 0.010 inch thickness, this film being subcoated on each side with polyvinyl alcohol and having a polyvinyl alcohol film of about 0.003 inch thickness permanently or temporarily laminated on each side in a well known manner. With the plastic material and the solutions maintained at room temperature, the plastic material is first immersed in solution A for a period of ten minutes, is then immersed in solution B for a period of three minutes, and is then immersed in solution $A_1$ for a period of twenty minutes. The film is well rinsed in tap water and then in distilled water immediately after the plastic material is removed from each of the above solutions. This imbibition process provides a plastic filter material having transmissive and absorptive properties as illustrated in FIG. 1.

The plastic filter material will have a generally green color and will be adapted for substantially complete absorption of ultra-violet light of wavelengths shorter than 4000 Angstrom units, for peak transmittance of visible light of about 30% for light of 5000 Angstrom units wavelength, for substantially complete absorption of light of wavelengths between 7500 and 10,000 Angstrom units wavelength, and for peak transmittance of infra-red light of wavelengths longer than 10,000 Angstrom units which does not exceed 8%.

The polyindamine dye compounds formed within the polyvinyl alcohol material in the above example will, of course, comprise products of a reaction between aniline and ammonium persulfate. Where polyindamine dye compounds which are the reaction products of others of the above listed aniline derivatives and oxidizing agents are established in dispersed relation within polyvinyl alcohol or other plastic materials by imbibition processes varying within the limits previously described, the specific transmissive and absorptive properties of the resultant filter materials will be different but will be closely related to those illustrated in FIG. 1. That is, such filter materials will be adapted for relatively high transmission of visible light and relatively high absorption of ultra-violet and infra-red light.

It should be understood that although specific embodiments of the filter materials and methods of material manufacture provided by this invention have been described for the purposes of illustration, this invention includes all modifications and equivalents thereof which fall within the scope of the appended claims.

Having described my invention, I claim:

1. A transparent plastic material having dispersed therein oxidatively polymerized dye compounds which are the reaction products of an organic substance selected from the group consisting of aniline, 2,5-diethoxyaniline, 2,5-dimethoxyaniline, o-toluidine, m-toluidine and N-phenyl-p-phenylenediamine reacted in situ within the plastic material with an oxidizing agent selected from the group consisting of permanganate salts, dichromate salts, chromate salts, ferricyanide salts, vanadate salts, vanadyl salts, chlorate salts, chlorite salts, hypochlorite salts, peroxides, dioxides, iodate salts, persulfate salts, bromate salts and nascent oxygen.

2. A transparent plastic material having dispersed therein oxidatively polymerized dye compounds which are the products of an organic substance selected from the group consisting of aniline, o-toluidine, m-toluidine, 2,5-diethoxyaniline, 2,5-dimethoxyaniline and N-phenyl-p-phenylenediamine reacted in situ within the plastic material in the presence of an acid with an oxidizing agent selected from the group consisting of permanganate salts, dichromate salts, chromate salts, ferricyanide salts, vanadate salts, vanadyl salts, chlorate salts, chlorite salts, hypochlorite salts, peroxides, dioxides, iodate salts, persulfate salts, bromate salts and nascent oxygen.

3. A transparent plastic material having dispersed therein oxidatively polymerized dye compounds which are the products of an organic substance selected from the group consisting of aniline, o-toluidine, m-toluidine, 2,5-diethoxyaniline, 2,5-di-methoxyaniline, and N-phenyl-p-phenylenediamine reacted in situ within the plastic in the presence of a mineral acid and sodium chloride with an oxidizing agent selected from the group consisting of permanganate salts, dichromate salts, chromate salts, ferricyanide salts, vanadate salts, vanadyl salts, chlorate salts, chlorite salts, hypochlorite salts, peroxides, dioxides, iodate salts, persulfate salts, bromate salts and nascent oxygen.

4. A method for forming a plastic filter material comprising the steps of supplying a transparent plastic material; preparing a solution embodying an organic substance selected from the group consisting of aniline, o-toluidine, m-toluidine, 2,5-diethoxyaniline, 2,5-dimethoxyaniline and N-phenyl-p-phenylenediamine in concentration between 1% and saturation, sodium chloride in concentration between 0% and 25%, and an acid in concentration sufficient to establish a selected pH between 0 and 6.5 within the solution in a solvent adapted to permeate said plastic material, said pH being selected in accordance with the organic substance embodied in the solution; preparing another solution embodying an oxidizing agent selected from the group consisting of permanganate salts, dichromate salts, chromate salts, ferricyanide salts, vanadate salts, vanadyl salts, chlorate salts, chlorite salts, hypochlorite salts, peroxides, dioxides, iodate salts, persulfate salts, bromate salts and nascent oxygen in concentration between 1% and saturation and sodium chloride in concentration between 0% and 25% in a solvent adapted to permeate said plastic material; maintaining said solutions at a temperature between approximately 55° F. and 200° F.; imbibing one of said solutions within the plastic material for a period from 5 seconds to approximately 16 hours for dispersing said solution therein; immersing the plastic material in the other of said solutions for imbibing said other solution within the plastic material to induce reaction between said selected organic substance and oxidizing agent in situ within the plastic material for forming increasing quantities of infra-red absorbing organic dye compounds in dispersed relation therein and for providing the plastic with continuously increasing infra-red-absorbing properties during said immersion; and permitting the plastic material to remain in said other solution for a period from 5 seconds to approximately 16 hours for providing the plastic material with selected infra-red-absorbing properties.

5. A method for forming a plastic filter material comprising the steps of supplying a transparent plastic material; preparing a first solution embodying an organic substance selected from the group consisting of aniline, o-toluidine, m-toluidine, 2,5-diethoxyaniline, 2,5-dimethoxyaniline, and N-phenyl-p-phenylenediamine in concentration between 1% and saturation, sodium chloride in concentration between 0% and 25%, and a mineral acid in concentration sufficient to establish a selected pH between 0 and 6.5 within the solution in a solvent adapted to permeate said plastic material, said pH being selected in accordance with the organic substance embodied in the solution; preparing a second solution embodying an oxidizing agent selected from the group consisting of permanganate salts, dichromate salts, chromate salts, ferricyanide salts, vanadate salts, vanadyl salts, chlorate salts, chlorite salts, hypochlorate salts, peroxides, dioxides, iodate salts, persulfate salts, bromate salts and nascent oxygen in concentration between 1% and saturation and sodium chloride in concentration between 0% and 25% in a solvent adapted to permeate said plastic material; maintaining said solutions at a temperature between approximately 55° F. and 200° F.; imbibing one of said solutions within the plastic material for a period from 5 seconds to approximately 16 hours for dispersing said solution therein; immersing the plastic material in the other of said solutions for imbibing said other solution within the pastic material to induce reaction between said selected organic substance and oxidizing agent in situ within the plastic material for forming increasing quantities of infra-red-absorbing organic dye compounds in dispersed relation therein and for providing the plastic with continuously increasing infra-red-absorbing properties during said immersion; and permitting the plastic material to remain in said solution for a period from 5 seconds to approximately 16 hours for providing desired infra-red-absorbing properties therein.

References Cited in the file of this patent

UNITED STATES PATENTS

| | | |
|---|---|---|
| 2,895,955 | Heseltine et al. | July 21, 1959 |
| 2,971,921 | Coleman et al. | Feb. 14, 1961 |